(12) United States Patent
Fan et al.

(10) Patent No.: US 8,425,981 B1
(45) Date of Patent: Apr. 23, 2013

(54) METHOD FOR MAKING NANOPOROUS HYDROPHOBIC COATINGS

(75) Inventors: Hongyou Fan, Albuquerque, NM (US); Zaicheng Sun, Changchun (CN)

(73) Assignee: Sandia Corporation, Albuquerque, NM (US)

( * ) Notice: Subject to any disclaimer, the term of this patent is extended or adjusted under 35 U.S.C. 154(b) by 101 days.

(21) Appl. No.: 13/033,292

(22) Filed: Feb. 23, 2011

(51) Int. Cl.
*B05D 3/02* (2006.01)
*B05D 3/10* (2006.01)

(52) U.S. Cl.
USPC .................. 427/336; 427/373; 427/385.5

(58) Field of Classification Search .............. 427/162, 427/165, 167, 168, 169, 352, 353, 372.2, 427/384, 385.5, 336, 373
See application file for complete search history.

(56) References Cited

U.S. PATENT DOCUMENTS

| 6,270,846 | B1 * | 8/2001 | Brinker et al. ............... 428/64.1 |
| 7,253,017 | B1 * | 8/2007 | Roscheisen et al. ........... 438/57 |
| 2007/0166226 | A1 * | 7/2007 | Holmes et al. ................ 423/659 |
| 2009/0269016 | A1 * | 10/2009 | Korampally et al. ......... 385/129 |

* cited by examiner

*Primary Examiner* — Michael Cleveland
*Assistant Examiner* — Alexander Weddle
(74) *Attorney, Agent, or Firm* — Kevin W. Bieg (57) ABSTRACT

A simple coating method is used to form nanoporous hydrophobic films that can be used as optical coatings. The method uses evaporation-induced self-assembly of materials. The coating method starts with a homogeneous solution comprising a hydrophobic polymer and a surfactant polymer in a selective solvent. The solution is coated onto a substrate. The surfactant polymer forms micelles with the hydrophobic polymer residing in the particle core when the coating is dried. The surfactant polymer can be dissolved and selectively removed from the separated phases by washing with a polar solvent to form the nanoporous hydrophobic film.

12 Claims, 12 Drawing Sheets

Relative Humidity Effect on the Structure

SEM images of PS/P123 = 1/3, 10% in toluene spin-coating @ 2000rpm under RH =(A) 8%, (B) 20%, (C) 50%, (D) 60%.

SEM images of PS nanostructure from 10% PS-P123(1/3) in different solvents (A) CHCl₃, (B) THF, (C) Dioxane under RH=20%

METHOD FOR MAKING NANOPOROUS HYDROPHOBIC COATINGS

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to optical coatings and, in particular, to a method of making nanoporous hydrophobic coatings.

BACKGROUND OF THE INVENTION

Optical films are widely used in the manufacture of consumer electronics, semiconductor devices, and high-performance glass and ceramic materials. Presently most of these films are manufactured using complicated and costly processes, such as sputter deposition and chemical vapor deposition (CVD), which require nonambient processing conditions, expensive specialized processing chambers, unforgiving protocols, and highly trained operators. Although improvements in conventional physical deposition techniques have allowed thin-film deposition techniques to generally keep pace with minimum performance requirements of typical optical and semiconductor applications, this performance comes at a significant cost.

Therefore, a simpler and less expensive optical coating method is needed.

SUMMARY OF THE INVENTION

The present invention is directed to a method of making a nanoporous hydrophobic coating, comprising providing a solution comprising a hydrophobic polymer and a surfactant polymer in a selective solvent; coating the solution onto a substrate; drying the coating to evaporate the selective solvent and induce polymer phase separation, thereby forming surfactant micelle and mesophase; and washing the dried coating with a polar solvent to remove the surfactant polymer and form the nanoporous hydrophobic coating. For example, the hydrophobic polymer can comprise polystyrene, poly(3-hexylthiophene), poly(methyl methacrylate), poly(alkyl acrylate), a polyolefin, polyvinylchloride, or a fluoropolymer, and derivatives thereof. For example, the selective solvent can comprise toluene, tetrahydrofuran, dioxane, or chloroform. For example, the surfactant polymer can comprise an amphiphilic block copolymer comprising at least one hydrophilic block and at least one hydrophobic block. The surfactant polymer can be a nonionic triblock copolymer of general formula $EO_xPO_yEO_x$, such as PLURONIC® P123, P103, P105, P108, or P127 (PLURONIC is a registered trademark of BASF Corporation). The dried coating can be washed with an alcohol, such as methanol or ethanol, to dissolve and remove the surfactant polymer.

The rapid and versatile self-assembling method of the present invention employs nanotechnology as an alternative to current deposition methods. The method involves the self-assembly of polymers to form stable, nanostructured coatings with tailored properties. The method is elegant and simple, with more degrees of freedom than conventional coating processes. The method uses commercially available polymers, which are dispersed in common solvents, allowing easy and cost-effective routes to produce films through spin, dip, or spray coating in ambient conditions. During coating, evaporation of the solvents induces self-assembly, forming multifunctional films with a nanostructured surface, low surface energy, controllable porosity, and a refractive index ranging from approximately n=1.2 to 3.0. These films possess physical properties approaching those of materials that are typically fabricated using expensive deposition processes, such as CVD and sputtering. Additionally, the chemical and physical nature of the self-assembled polymer films can be further modified through a variety of near-ambient post-processes that enable tailoring of unique functions and properties. The ability to adjust the material parameters of the film at different stages (synthesis, deposition, or post-deposition) provides a powerful new degree of freedom over conventional deposition approaches. In particular, superhydrophobicity results from both the intrinsic hydrophobicity of the polymer and the tailored surface topology and roughness. Such highly transparent superhydrophobic coatings have potential applications as self-cleaning optical surfaces, such as in outdoor solar devices, windshields, photovoltaics, anticorrosion coatings, and de-icing applications.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 3A is an SEM of a low 3% PS concentration coating that was formed in a low relative humidity (RH). FIG. 3B is an SEM of a high 20% PS concentration coating formed in a high RH.

FIG. 5A is an SEM image of a 1/1 5% PS/P123 film. FIG. 5B is an SEM image of a 1/1 10% PS/P123 film. FIG. 5C is an SEM image of a 1/1 20% PS/P123 film. FIG. 5D is an SEM image of a 1/3 15% PS/P123 film.

FIG. 6A is an SEM image of a film made under 8% RH. FIG. 6B is an SEM image of a film made under 20% RH. FIG. 6C is an SEM image of a film made under 50% RH.

FIG. 6D is an SEM image of a film made under 60% RH.

FIG. 7A is an SEM image of a film made with Mw=3640. FIG. 7B is an SEM image of a film made with Mw=8400. FIG. 7C is an SEM image of a film made with Mw=18000. FIG. 7D is an SEM image of a film made with Mw=50,000. FIG. 7E is an SEM image of a film made with Mw=97,000. FIG. 7F is an SEM image of a film made with Mw=223,000.

FIG. 8A is an SEM image of a film made with P103 surfactant. FIG. 8B is an SEM image of a film made with P105 surfactant. FIG. 8C is an SEM image of a film made with P108 surfactant. FIG. 8D is an SEM image of a film made with P127 surfactant.

FIG. 9A is an SEM image of a film made in chloroform. FIG. 9B is an SEM image of a film made in tetrahydrofuran. FIG. 9C is an SEM image of a film made in dioxane.

DETAILED DESCRIPTION OF THE INVENTION

The present invention is directed to a simple coating method to form nanoporous hydrophobic films that can be used as optical coatings. The method uses evaporation-induced self-assembly of materials. The coating method starts with a solution containing a mixture of polymers or inorganic components (or with other many additives). For example, a first solution can comprise a hydrophobic polymer in a selective solvent. The first solution can be mixed with a second solution comprising an amphiphilic surfactant polymer. The resulting mixture can be coated onto a substrate. Drying of the coating induces polymer phase separation. In particular, the surfactant polymer forms micelles with the hydrophobic polymer residing in the particle core when placed in a selective solvent and dried. The surfactant polymer can be dissolved and selectively removed from the separated phases by washing with a polar solvent to form a nanostructured hydrophobic polymer film. By using readily available, commercial precursors or chemicals, film compositions can be fine-tuned to tailor film properties.

A variety of hydrophobic polymers can be used to form such films using this method. For example, polystyrene (PS), poly(3-hexylthiophene) (P3HT), and derivatives thereof can be used. Other suitable hydrophobic polymers include but are not limited to, for example, poly(methyl methacrylate), poly (alkyl acrylate), polyolefins (e.g., polyethylene and polypropylene), polyvinylchloride, fluoropolymers (e.g., polytetrafluoroethylene and polyvinylfluoride), and derivatives thereof. A range of different molecular weights of the hydrophobic polymer can be used. The role of the surfactant is to induce self-assembly of the hydrophobic polymer to form nanostructured composite films of the polymer/surfactant through the formation of micelle or mesophase. Therefore, a variety of surfactant polymers can be used. For example, the surfactant polymer can be an amphiphilic block copolymer comprising at least one hydrophobic block and at least one hydrophilic block. For example, the block copolymer can be a PLURONIC surfactant, or poloxamer. For example, a poloxamer comprising a triblock copolymer based on poly(ethylene glycol)-poly(propylene glycol)-poly(ethylene glycol) [PEO-b-PPO-b-PEO] can be used. Suitable poloxamer surfactants manufactured by the BASF Corporation include PLURONIC P123 ($EO_{20}PO_{70}EO_{20}$), P103 ($EO_{17}PO_{60}EO_{17}$), P105 ($EO_{37}PO_{58}EO_{37}$), P108 ($EO_{132}PO_{50}EO_{132}$), P127 ($EO_{106}PO_{70}EO_{106}$), etc. These poloxamers are nonionic, surface active, and form micelles and mesophases. The selective solvent preferably dissolves both the hydrophobic polymer and the surfactant polymer to form a homogeneous solution, which can be important for the formation of uniform films. Different selective solvents can be used, such as toluene, tetrahydrofuran, 1,4-dioxane, chloroform, etc. The solution can be applied to the substrate using a variety of coating processes that relies on solvent drying, such as spin coating, dip-coating, spray-coating, ink-jet printing, or micro-pen writing. Drying of the coating induces polymer phase separation and the formation of a composite film. After assembly of the composite film, a polar solvent can be applied to wash off the surfactant polymer (e.g., block copolymer) and provide the nanoporous hydrophobic coating. The polar solvent selectively dissolves the block copolymer, but not the hydrophobic polymer core. For example, the wash can comprise an alcohol, such as methanol or ethanol.

Humidity can be important for the control of varied film surface nanostructure/morphology, resulting in different film properties, such as porosity and hydrophobicity. In particular, it is thought that humidity is favorable for the self-assembly of poloxamer surfactants. When water absorbs on the PEO segments, the hydrated PEO becomes more hydrophilic than unhydrated PEO. This water absorption may enhance the amphiphilic nature of the poloxamer surfactant, facilitating phase separation and self-assembly.

The intrinsic hydrophobic nature of the resulting polymer eliminates surface tension and drying stress that can cause cracking in conventional film deposition processes. The films are hydrophobic due to the nanostructure formed during the self-assembly process. The water contact angles (or hydrophobic nature) depend on the processing conditions. In particular, the low surface energy and nanostructured character of the coating can cause the surface to be superhydrophobic, which prevents moisture from deteriorating the optical performance. For example, the average water contact angle (CA) can be >150°. Therefore, these films exhibit controlled porosity and hydrophobicity (as measured by water contact angle) depending on processing conditions.

The solution coating process can produce nonporous films in ambient conditions without using expensive specialized equipment. Final film thicknesses ranging from a hundred nanometers to tens of micrometers (µms) can be easily controlled by modifications to the precursor concentration and coating process (e.g., spin coating speed). The process is compatible with conventional spray processing. Hence it can be directly applied to the coating of large or complex parts and is not restricted to the typical equipment and facility limitations of conventional chemical and physical vapor deposition processes. In particular, the coatings can easily be applied to large areas and non-flat surfaces.

Multiple-layered coatings exhibit tunable reflectivity over the visible and far infrared regions. Reflectivity of R<2% with no absorption in the visible spectrum and incidence angles of 0° to 60° can be achieved.

Formation of hybrid coatings through the incorporation of organic and inorganic functional elements can bring new chemical and physical properties to bear that are not available in conventional coating processes. For example, by using the semiconducting polymer P3HT nanostructured semiconductor films can be fabricated for photovoltaic fabrications, and by using hydrolyzed titanium oxides, uniform nanostructured titanium coatings can be fabricated for organic solar cells.

EXAMPLE

Polystyrene PLURONIC P123 Coating

Figure 1:
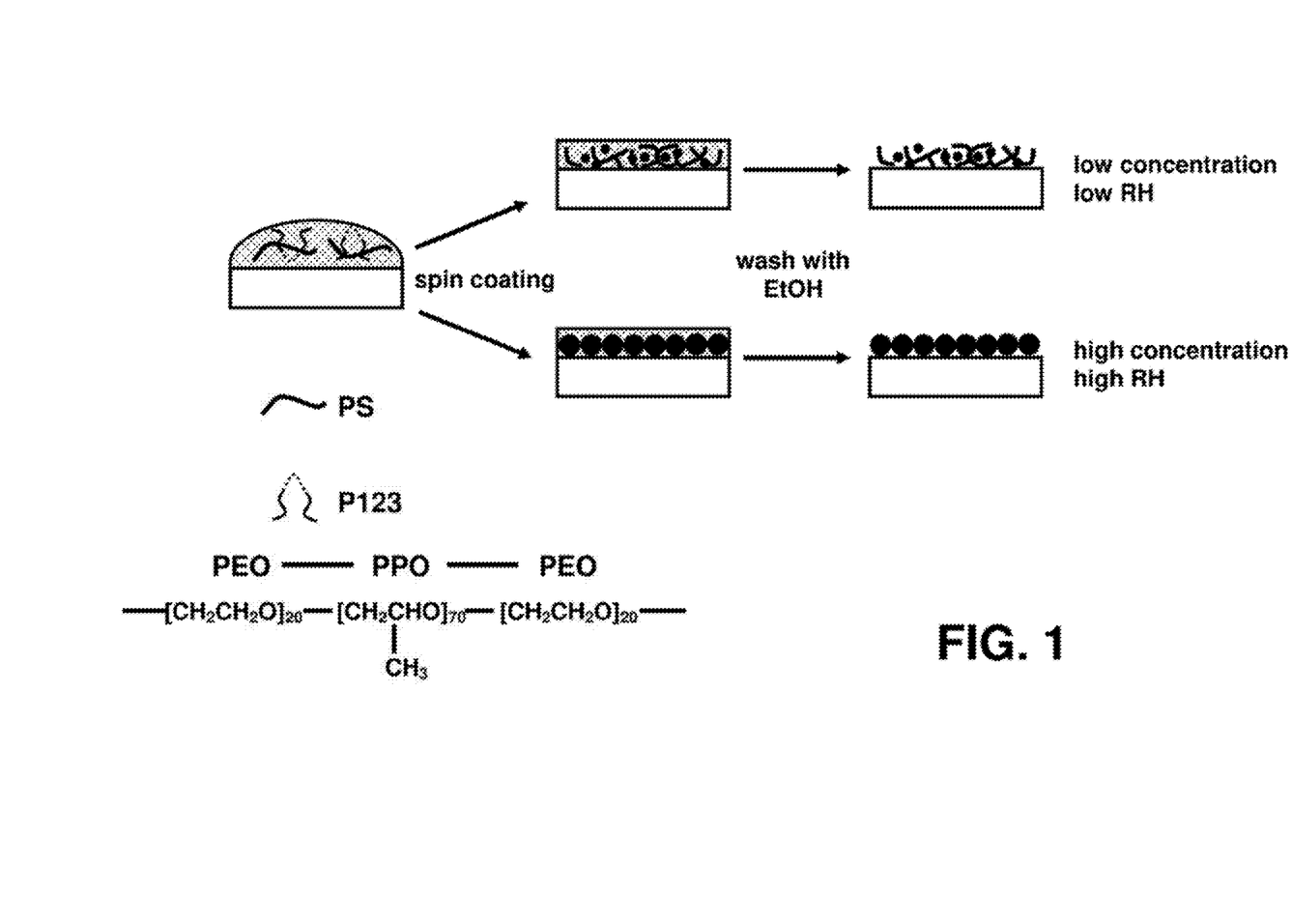
FIG. 1 shows an example of the method of making a nanoporous hydrophobic coating that uses polystyrene (PS) as the hydrophobic polymer, PLURONIC P123 as the surfactant polymer, and toluene as the solvent.

FIG. 1 is a schematic illustration of an exemplary method of the present invention. In this example, polystyrene ($PS_{8K}$ $M_w$: 8000 DP=1.05) was dissolved into toluene to form a 1-30% first solution. Polystyrene is a transparent hydrophobic polymer with chemical formula $(C_8H_8)_n$. Surfactant PLURONIC P123 was added into toluene to form a 1-30% second solution. PLURONIC P123 has the general formula $EO_{20}PO_{70}EO_{20}$. 1 ml of the first solution was added into 1 ml of the second solution to form a homogenous solution that was stirred over 30 min. The films were formed through spin-coating of the homogeneous solution on a plasma-cleaned silicon substrate at 2000 rpm for 40 s. During spin coating, drying induces polymer phase separation. PLURONIC P123 forms micelles with the nonpolar PPO block encapsulating the hydrophobic PS core and the polar PEO blocks at the micellar surface. The films were then immersed into ethanol (EtOH) to remove the P123 and form a nano-structured, porous, hydrophobic polystyrene film coating on the substrate. Films formed with low PS concentration at low RH humidity tend to have a worm-like porous topology. Films formed with high PS concentration at high RH tend to have a particles topology.

Figure 2:
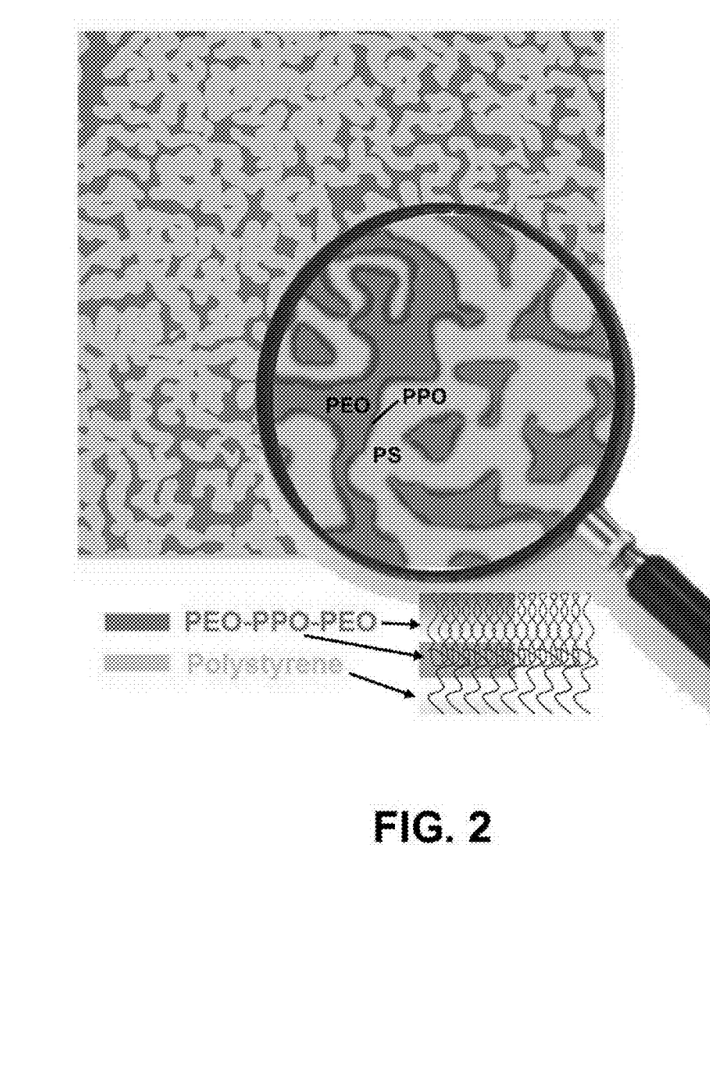
FIG. 2 is a top-view schematic illustration of a dried film after phase separation, but prior to washing.

FIG. 2 is a top-view schematic illustration of a dried film after phase separation, but prior to washing. As described above, the pluronic P123 will form micelles with the nonpolar PPO block positioning toward the hydrophobic PS molecules and the polar PEO blocks positioning away from the PS molecules. The resulting film comprises a PS phase separated from a PEO phase by a PPO interface.

Figure 3:
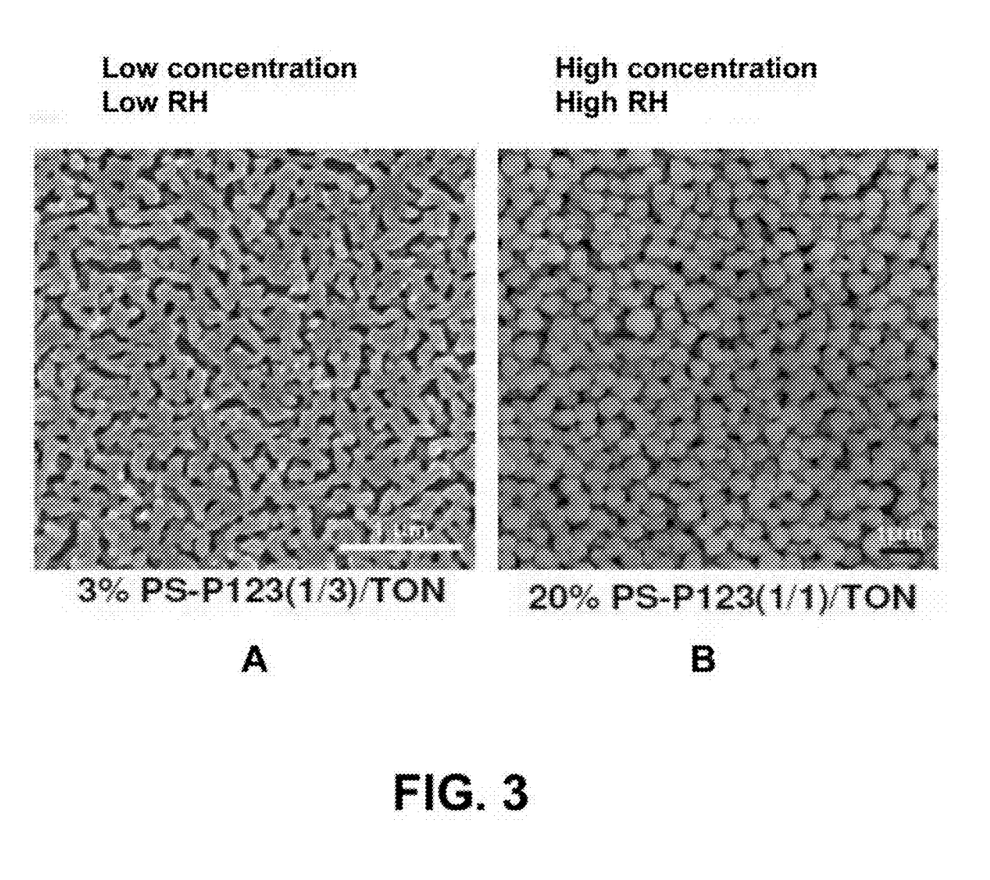
FIG. 3 shows scanning electron microscopy (SEM) images of polystyrene film/coatings on substrates.

FIG. 3 shows scanning electron microscopy (SEM) images of the PS film/coatings on the substrates. FIG. 3A is an SEM of a low 3% PS concentration film that was formed in a low humidity. The coating shows an interconnected worm-like porous film topology. FIG. 3B is an SEM of a high 20% PS concentration coating formed in a high humidity. The coating shows a PS matrix with a particles topology. This surface is uniformly textured with monodisperse several-hundred-nanometer-sized polystyrene particles spaced tens to hundreds of nanometers apart. A film comprising particles of this size and spacing can provide a unique roughness that makes the surface structurally hydrophobic.

Figure 4:
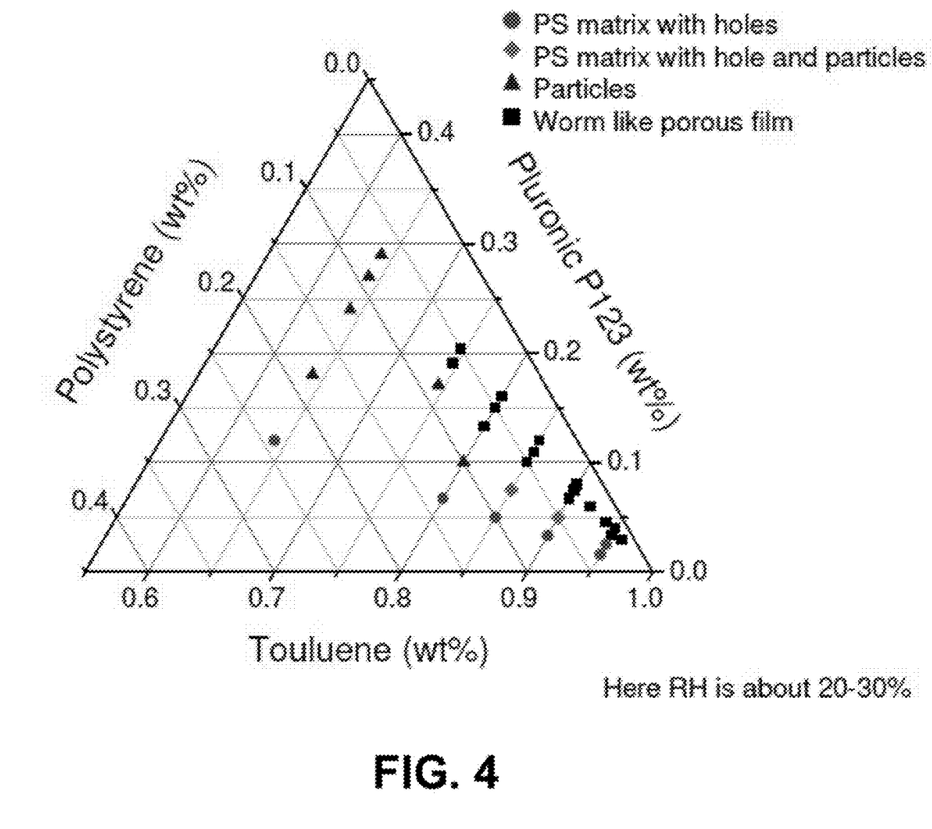
FIG. 4 shows a phase diagram of the polystyrene PLURONIC P123-toluene system.

FIG. 4 shows a phase diagram of the polystyrene PLURONIC P123-toluene system. The relative humidity during spin coating was about 20-30%. As can be seen, a worm-like topology is formed at polystyrene concentrations lower than about 5 wt %. A particles topology is formed at polystyrene concentrations of between about 5 and 20 wt % and PLURONIC P123 concentrations of between about 10 and 30 wt %. A continuous polystyrene matrix with holes and/or particles is found at higher polystyrene concentrations and lower PLURONIC P123 concentrations.

Figure 5:
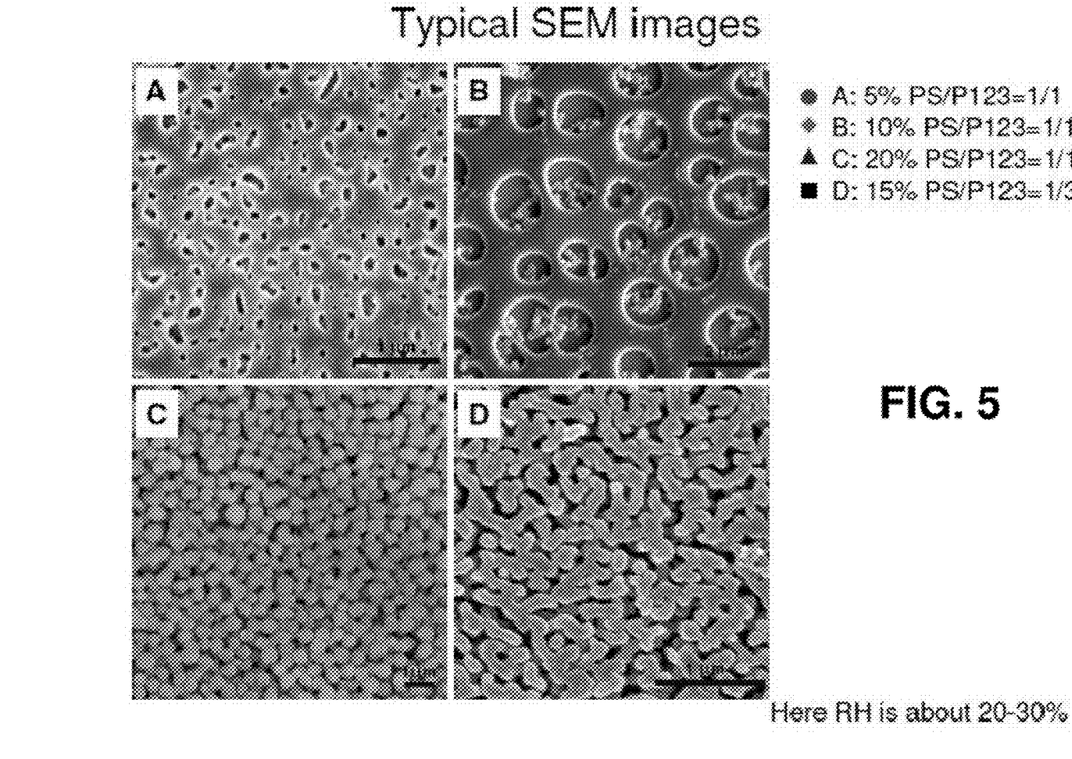
FIG. 5 shows the effects of varying polystyrene concentrations on the film topology.

FIG. 5 shows the topological effects of varying polystyrene concentrations on the film topology, as shown graphically in the phase diagram. FIG. 5A is an SEM image of a 1/1 5% PS/P123 film. The film comprises a PS matrix with holes. FIG. 5B is an SEM image of a 1/1 10% PS/P123 film. The film comprises a PS matrix with holes and particles. FIG. 5C is an SEM image of a 1/1 20% PS/P123 film. The film comprises uniform particles. FIG. 5D is an SEM image of a 1/3 15% PS/P123 film. The film comprises a worm-like porous film.

Figure 6:
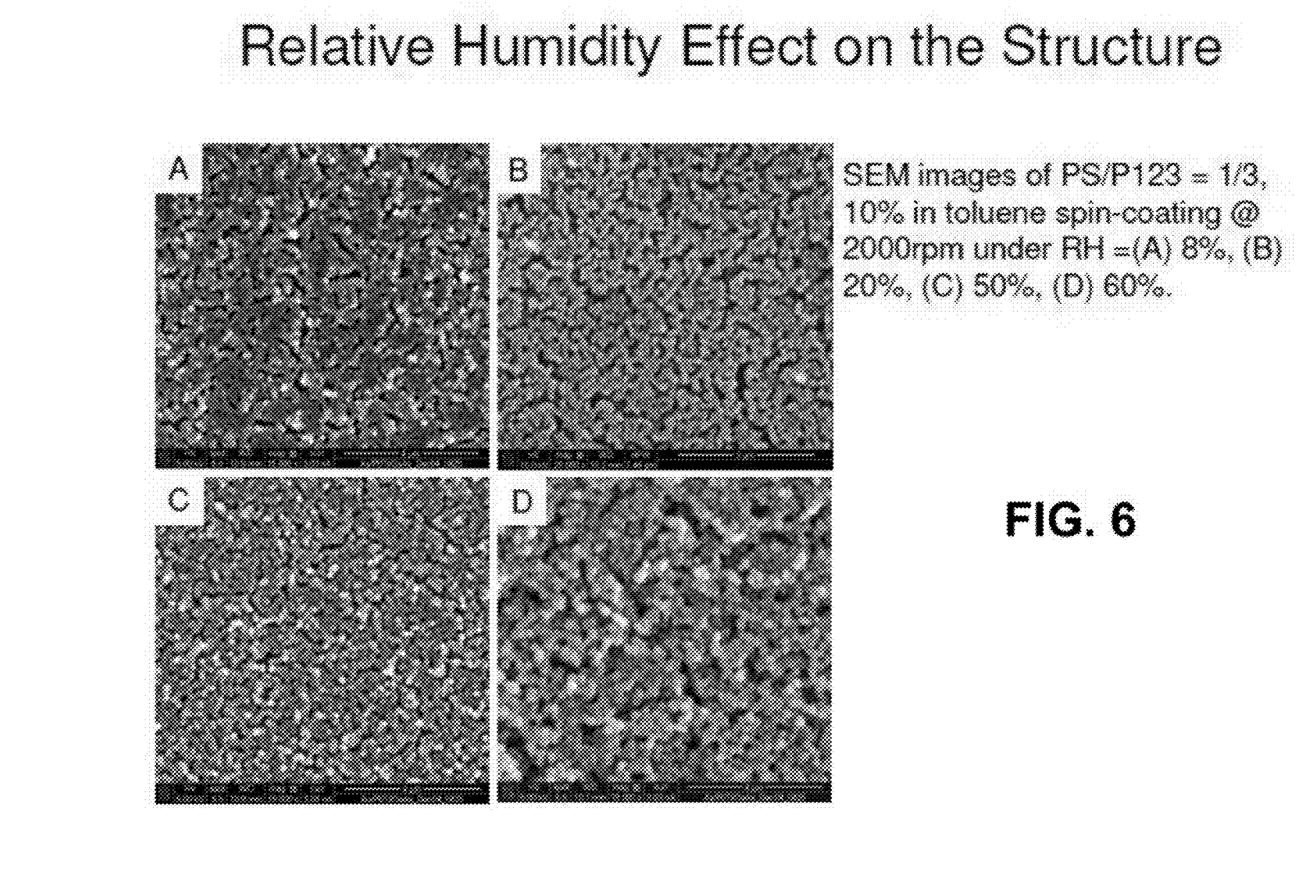
FIG. 6 shows the effects of relative humidity on film structure.

FIG. 6 shows the effects of relative humidity on the film structure. A 1/3 10% PS/P123 solution in toluene was spin-coated on a substrate at 2000 rpm to form the films. FIG. 6A is an SEM image of a film made under 8% RH. FIG. 6B is an SEM image of a film made under 20% RH. FIG. 5C is an SEM image of a film made under 50% RH. FIG. 6D is an SEM image of a film made under 60% RH. The most uniform particles topology was formed in a relative humidity range of between about 20 and 50%.

Figure 7:
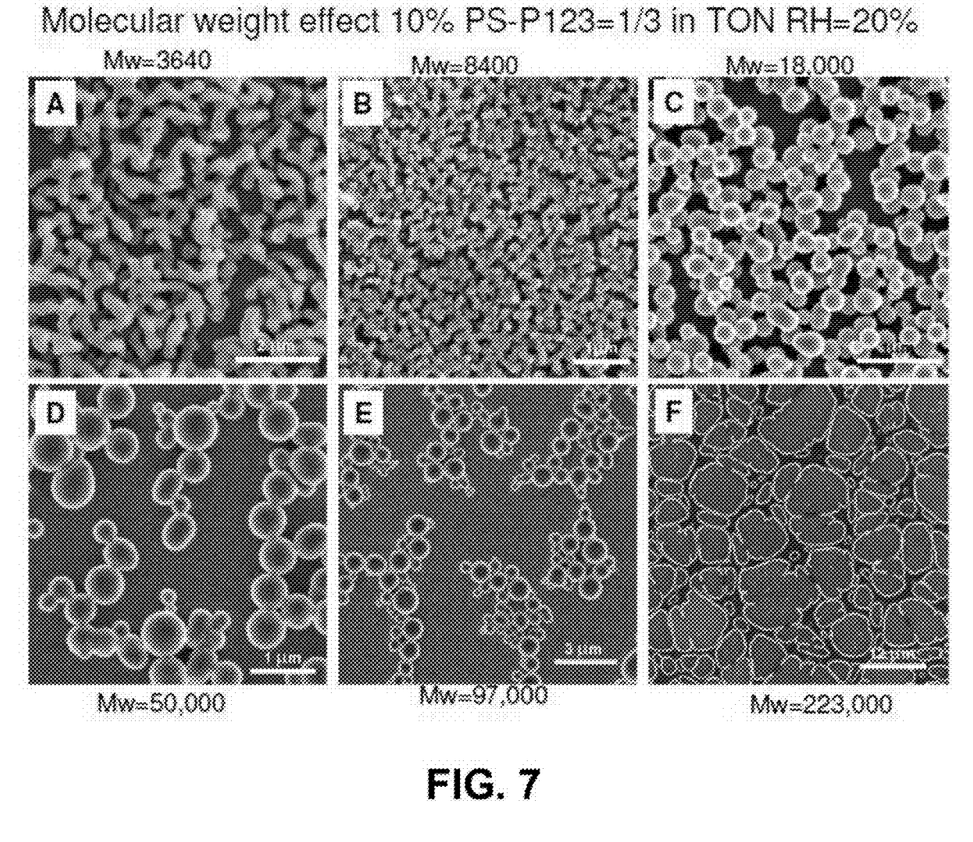
FIG. 7 shows the effects of molecular weight (Mw) of PS on the film structure.

FIG. 7 shows the effects of molecular weight (Mw) of PS on the film structure. For this example, PS with Mw=3640, 8400, 18,000, 50,000, 97,000, and 223,000 were used. The coatings comprise 1/3 10% PS/P123 films in toluene made under 20% RH. FIG. 7A is an SEM image of a film made with Mw=3640. FIG. 7B is an SEM image of a film made with Mw=8400. FIG. 7C is an SEM image of a film made with Mw=18000. FIG. 7D is an SEM image of a film made with Mw=50,000. FIG. 7E is an SEM image of a film made with Mw=97,000. FIG. 7F is an SEM image of a film made with Mw=223,000. A uniform particles topology was obtained at a molecular weight range of between about 8400 and 18.000. Macrophase separation occurs for high molecular weight polymers, resulting in nonuniform or discontinuous films.

Figure 8:
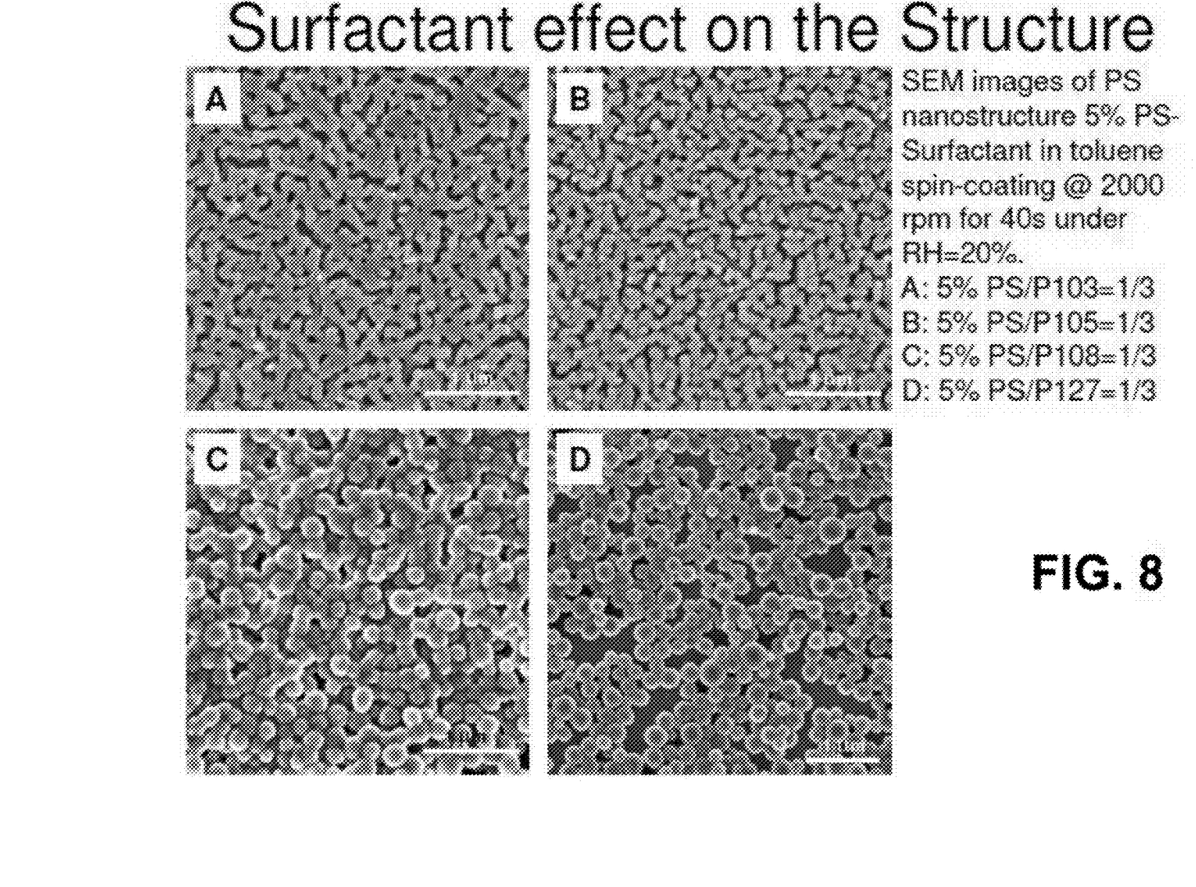
FIG. 8 shows the effects of different surfactants on the film structure.

FIG. 8 shows the effects of different PLURONIC surfactants on the film structure. The coatings comprise 1/3 5% PS/surfactant films in toluene spin-coated on a substrate at 2000 rpm for 40 s under 20% RH. FIG. 8A is an SEM image of a film made with P103 surfactant. FIG. 8B is an SEM image of a film made with P105 surfactant. FIG. 8C is an SEM image of a film made with P108 surfactant. FIG. 8D is an SEM image of a film made with P127 surfactant. As the size of the PEO blocks of the PLURONIC surfactant increases, the films tend to change from a worm-like to a particles topology.

Figure 9:
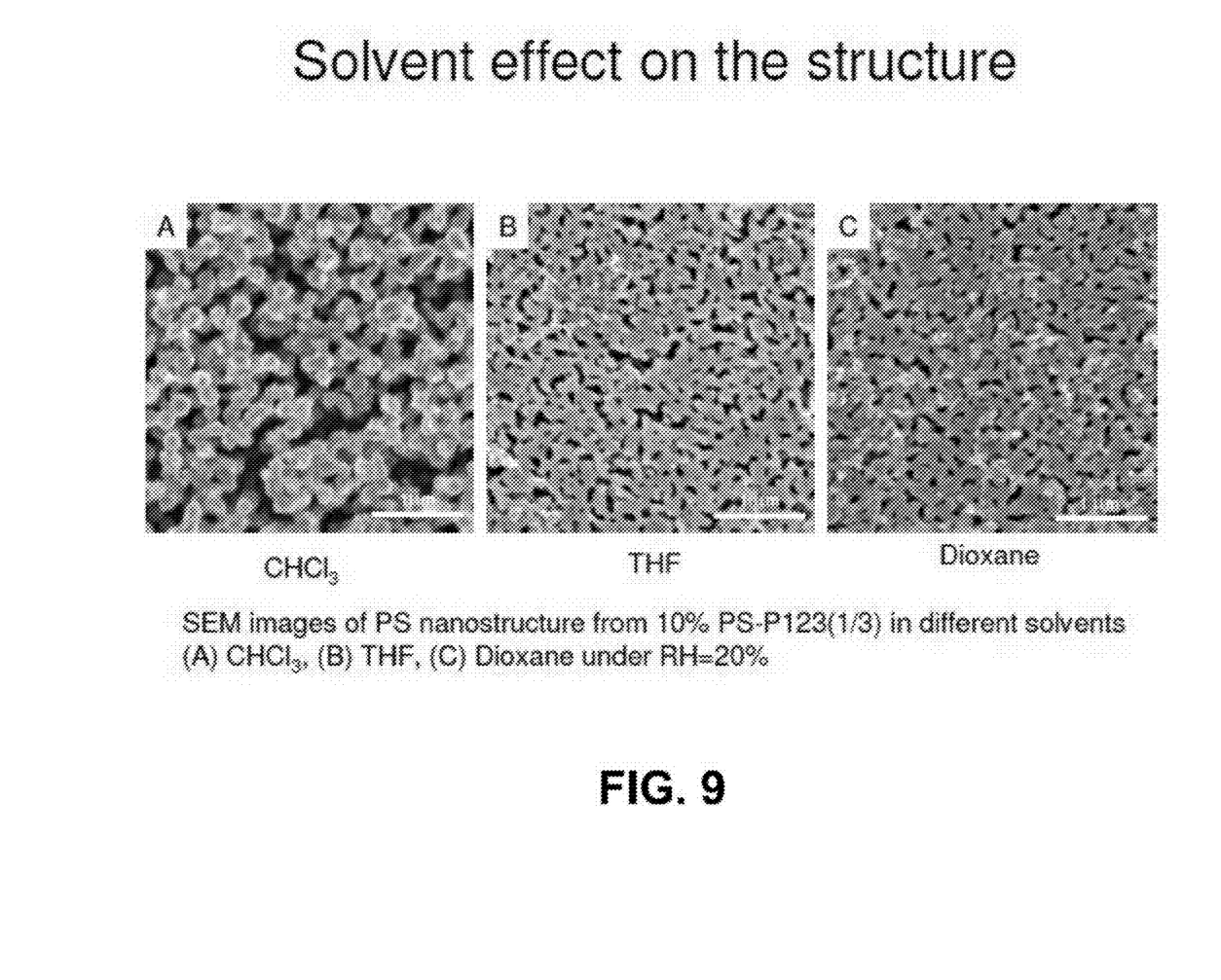
FIG. 9 shows the effects of different selective solvents on the film structure.

FIG. 9 shows the effects of different solvents on the film structure. The coatings comprise 10% PS/P123 (1/3) films in different solvents made under 20% RH. FIG. 9A is an SEM image of a film made in chloroform ($CHCl_3$). FIG. 9B is an SEM image of a film made in tetrahydrofuran (THF). FIG. 9C is an SEM image of a film made in dioxane. All of these solvents produce good nanoporous films with the PS/P123 system.

Figure 10:
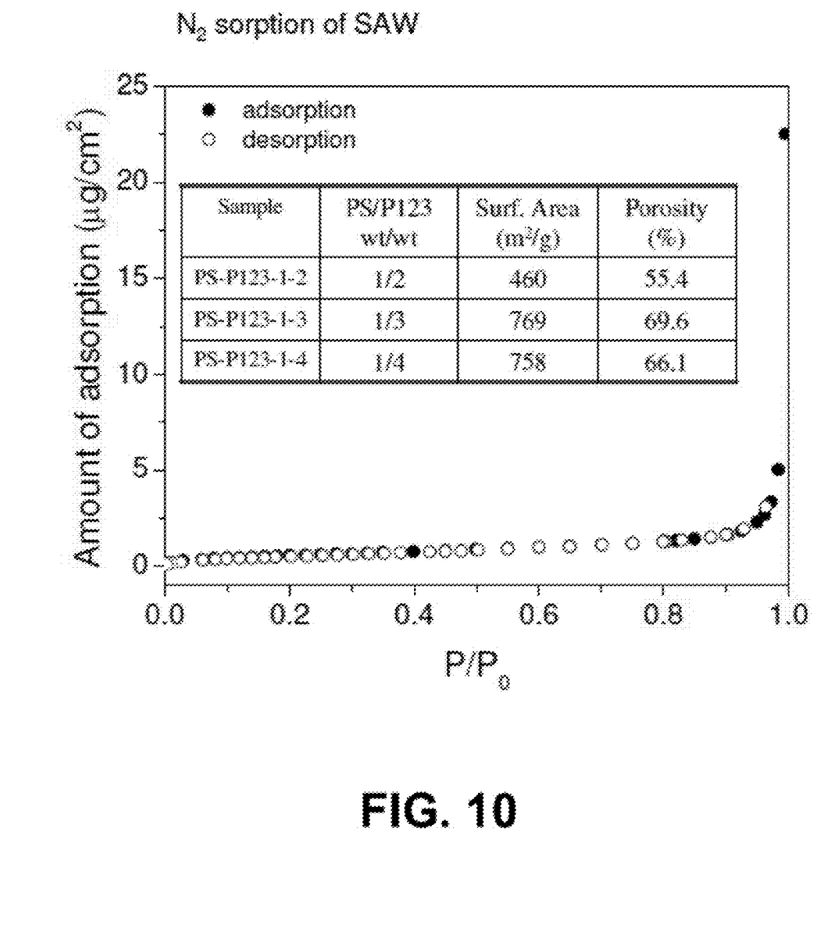
FIG. 10 shows nitrogen sorption isotherms obtained at 77 K for porous films.

The specific surface area can be determined by measuring the nitrogen sorption isotherms of the coatings. FIG. 10 shows nitrogen sorption isotherms obtained at 77 K for porous films. The films were applied to an area of about 1 $cm^2$ on a piezoelectric ST-cut quartz substrate with interdigital gold transducers designed to operate at ~97 MHz. Mass change was monitored (~80 pg $cm^{-2}$ sensitivity) as a function of relative pressure using a surface acoustic wave.

Table 1 shows the refractive index and porosity of films formed with different PS/P123 ratios. The refractive index was determined by ellipsometry. Porosity was determined from nitrogen sorption isotherms, as described above. As expected, the refractive index decreases with increasing film porosity.

TABLE 1

Refractive index and porosity of PS thin films

| Sample | PS/P123 (wt/wt) | Thickness (nm) | Refractive index (n at 550 nm) | Porosity (%) |
|---|---|---|---|---|
| PS-P123-2-1 | 2/1 | 490 | 1.49 | 10.9 |
| PS-P123-1-1 | 1/1 | 205 | 1.42 | 23.6 |
| PS-P123-1-2 | 1/2 | 415 | 1.38 | 30.1 |
| PS-P123-1-3 | 1/3 | 331 | 1.30 | 45.4 |
| PS-P123-1-4 | 1/4 | 381 | 1.17 | 69.1 |

Nanoporous films with small surface roughness, low refractive index (n), and film thickness of approximately one-quarter of the reference visible wavelength can be applied to improve the light transmission of substrates in the visible wavelength range. Such anti-reflection coatings can enhance the transmission of light because of destructive interference between light reflected from the coating-substrate and the air-coating interfaces. The anti-reflection properties of a coating on a transparent substrate can be determined by measuring the optical transmission spectrum of the coated substrate.

Figure 11:
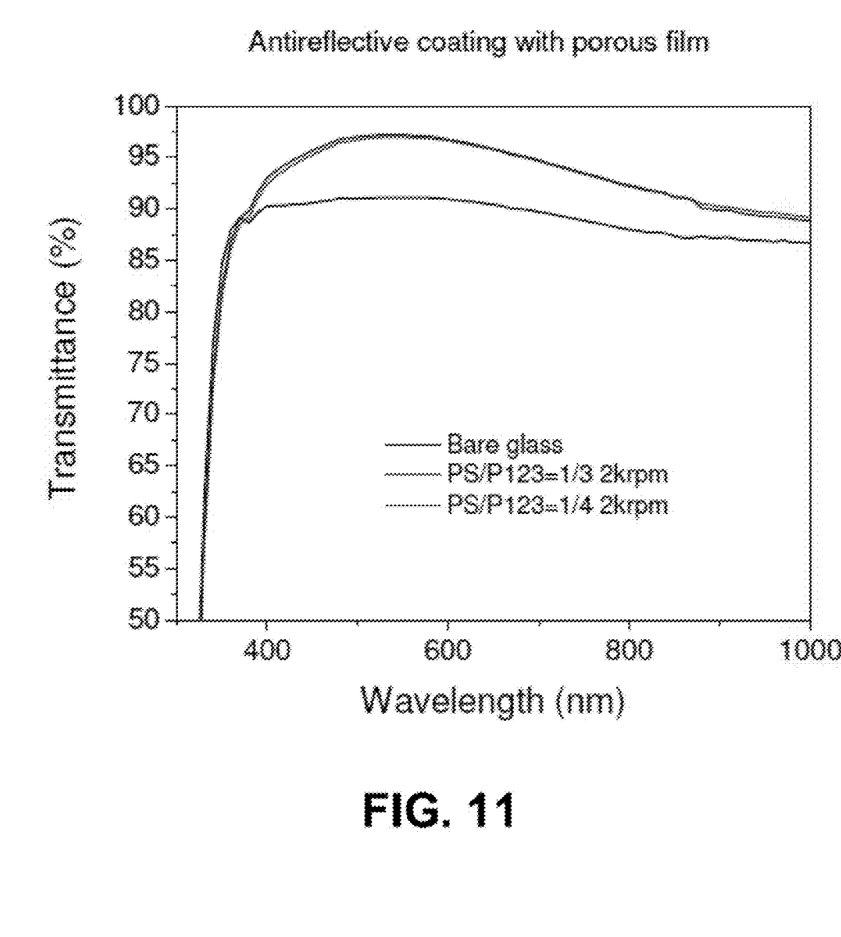
FIG. 11 shows UV-Vis transmission spectra of bare glass and glass coated with nanoporous hydrophobic optical coatings.

The method of the present invention enables the application of efficient anti-reflection coatings with tailored film thickness, composition, and functionality on a variety of substrates of different size and shape. FIG. 11 shows UV-Vis transmission spectra of bare glass (n=1.52) and glass coated with nanoporous hydrophobic optical coatings. These coatings have a refractive index of n~1.30 and a film thickness of about 150 nm. The transmission is above 98% at 500 to 600 nm for the coated glass, compared to only about 90% for the bare glass.

Figure 12:
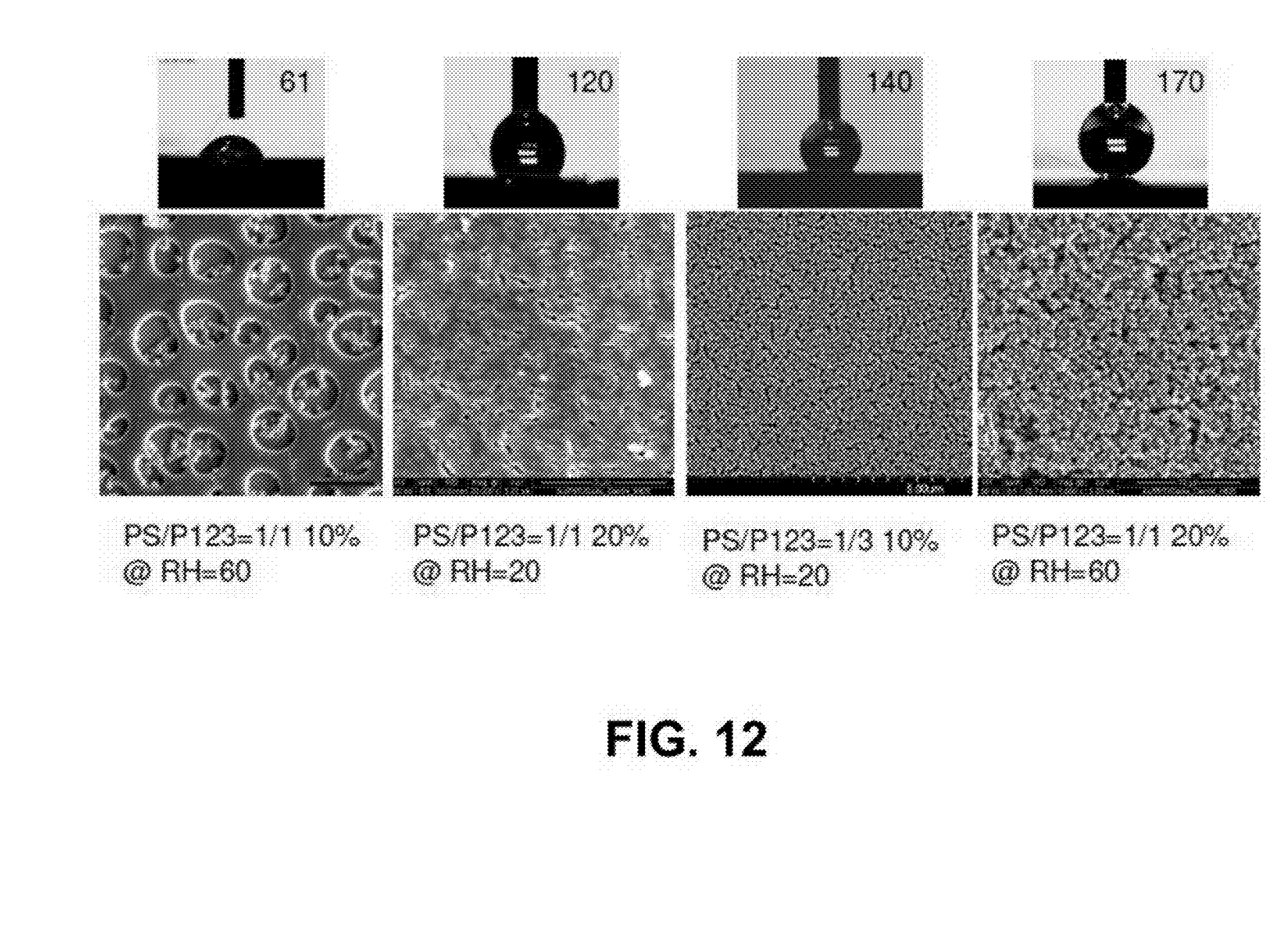
FIG. 12 shows contact angle for different PS films made under differing RH.

The wettability can be determined by measuring the CA of a water droplet on the surface of the coating, as shown in FIG. 12. The insets in the water droplet images show the contact angles for different PS structures made under differing RH.

Table 2 shows contact angle measurements of PS coatings made under different conditions. Coatings made with a low PS concentration formed in a low humidity are slightly hydrophobic, with water CAs near that of a smooth PS film. Hydrophobicity increases strongly with relative humidity up to about 60% RH, due to surface topological effects. Superhydrophobic coatings (CA>150°) were obtained for coatings formed at high RH. Importantly, some superhydrophobic coatings can cause water and polar liquids to be repelled and roll off of the coating, carrying away dust and surface contaminants while leaving little or no residue. Such surfaces can therefore have a self-cleaning property.

TABLE 2

Contact angle of different structure PS thin films

| PS/P123 | 1/1 10% | 1/1 20% | 1/3 10% | 1/3 50% |
| --- | --- | --- | --- | --- |
| RH = 8.5 | 85 | 87 | 130 | 86 |
| RH = 20 | 86 | 120 | 135 | 128 |
| RH = 50 | 61 | 162 | 153 | 152 |
| RH = 60 |  | 169 | 158 | 169 |

The present invention has been described as a method for making nanoporous hydrophobic coatings. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method of making a nanoporous hydrophobic polymer coating, comprising:
    providing a solution comprising a hydrophobic polymer and a surfactant polymer in a selective solvent;
    coating the solution onto a substrate;
    drying the solution after the coating step to evaporate the selective solvent and induce polymer phase separation, thereby forming surfactant micelle and mesophase in a dried coating; and
    washing the dried coating with a polar solvent to remove the surfactant polymer and form a nanoporous hydrophobic polymer coating.

2. The method of claim 1, wherein the hydrophobic polymer comprises polystyrene, poly(3-hexylthiophene), or a derivative thereof.

3. The method of claim 1, wherein the hydrophobic polymer comprises poly(methyl methacrylate), poly(alkyl acrylate), polyolefin, polyvinylchloride, fluoropolymer, or a derivative thereof.

4. The method of claim 1, wherein the selective solvent comprises toluene, tetrahydrofuran, dioxane, or chloroform.

5. The method of claim 1, wherein the surfactant polymer comprises a nonionic polymer.

6. The method of claim 1, wherein the surfactant polymer comprises an amphiphilic block copolymer comprising at least one hydrophilic block and at least one hydrophobic block.

7. The method of claim 6, wherein the surfactant polymer comprises a poloxamer.

8. The method of claim 7, wherein the poloxamer comprises a triblock copolymer of general formula $EO_xPO_yEO_x$.

9. The method of claim 8, wherein the poloxamer comprises $EO_{20}PO_{70}EO_{20}$, $EO_{17}PO_{60}EO_{17}$, $EO_{37}PO_{58}EO_{37}$, $EO_{132}PO_{50}EO_{132}$), or $EO_{106}PO_{70}EO_{106}$.

10. The method of claim 6, wherein the surfactant polymer comprises a diblock copolymer of general formula $EO_xPO_y$.

11. The method of claim 1, wherein the step of coating comprises spin coating, dip-coating, spray-coating, ink-jet printing, or micro-pen writing.

12. The method of claim 1, wherein the polar solvent comprises an alcohol.

* * * * *